United States Patent [19]

Lang et al.

[11] Patent Number: 5,032,549
[45] Date of Patent: * Jul. 16, 1991

[54] HIGHLY POROUS CERAMIC MATERIAL FOR ABSORPTION AND ADSORPTION PURPOSES, PARTICULARLY FOR ANIMAL LITTER/BEDDING

[75] Inventors: Rudiger Lang, Minden; Bernd Meyer, Bremen, both of Fed. Rep. of Germany

[73] Assignee: Effem GmbH, Verden/Aller, Fed. Rep. of Germany

[*] Notice: The portion of the term of this patent subsequent to May 14, 2008 has been disclaimed.

[21] Appl. No.: 474,638

[22] Filed: Feb. 1, 1990

Related U.S. Application Data

[60] Continuation of Ser. No. 297,986, Jan. 17, 1989, abandoned, which is a division of Ser. No. 71,539, Jul. 8, 1987, Pat. No. 4,824,810, which is a continuation of Ser. No. 810,014, Dec. 17, 1985, abandoned.

[30] Foreign Application Priority Data

Apr. 19, 1984 [DE] Fed. Rep. of Germany ....... 3414965

[51] Int. Cl.$^5$ ................................................ C04B 38/00
[52] U.S. Cl. ..................................... 501/84; 501/141; 501/144; 119/173; 502/407
[58] Field of Search ....................... 119/1; 501/84, 127, 501/141, 144; 502/80, 407

[56] References Cited

U.S. PATENT DOCUMENTS

| | | | |
|---|---|---|---|
| 1,998,686 | 4/1935 | Parsons | 501/84 X |
| 2,543,987 | 3/1951 | Ramsay | 501/84 X |
| 3,993,498 | 11/1976 | Koekemoer | 106/456 |
| 4,275,684 | 6/1981 | Krämer et al. | 119/1 |
| 4,318,996 | 3/1982 | Magder | 501/84 |
| 4,341,561 | 7/1982 | Britt et al. | 501/84 X |
| 4,356,271 | 10/1982 | Francis et al. | 501/84 |
| 4,424,280 | 1/1984 | Malric | 501/84 |

Primary Examiner—Karl Group
Attorney, Agent, or Firm—Curtis, Morris & Safford

[57] ABSTRACT

Highly porous ceramic material for adsorption and absorption purposes, particularly for animal litter, characterized by a porosity of 50 to 300%, preferably 200 to 250%; a water absorption capacity of 50 to 200%, preferably 100 to 150%; a pH-value in the range 5 to 9, preferably 7 to 8; a bulk density of 400 to 700 g/l; an internal surface (BET-$N_2$) between 20 and 200 m$^2$/g, preferably between 80 and 150 m$^2$/g; which can be produced by firing a foamed mixture of clay or clays, optionally aggregate or aggregates, anionic or cationic surfactant or surfactants and deflocculant or deflocculants, process for the production thereof and use thereof.

11 Claims, 1 Drawing Sheet

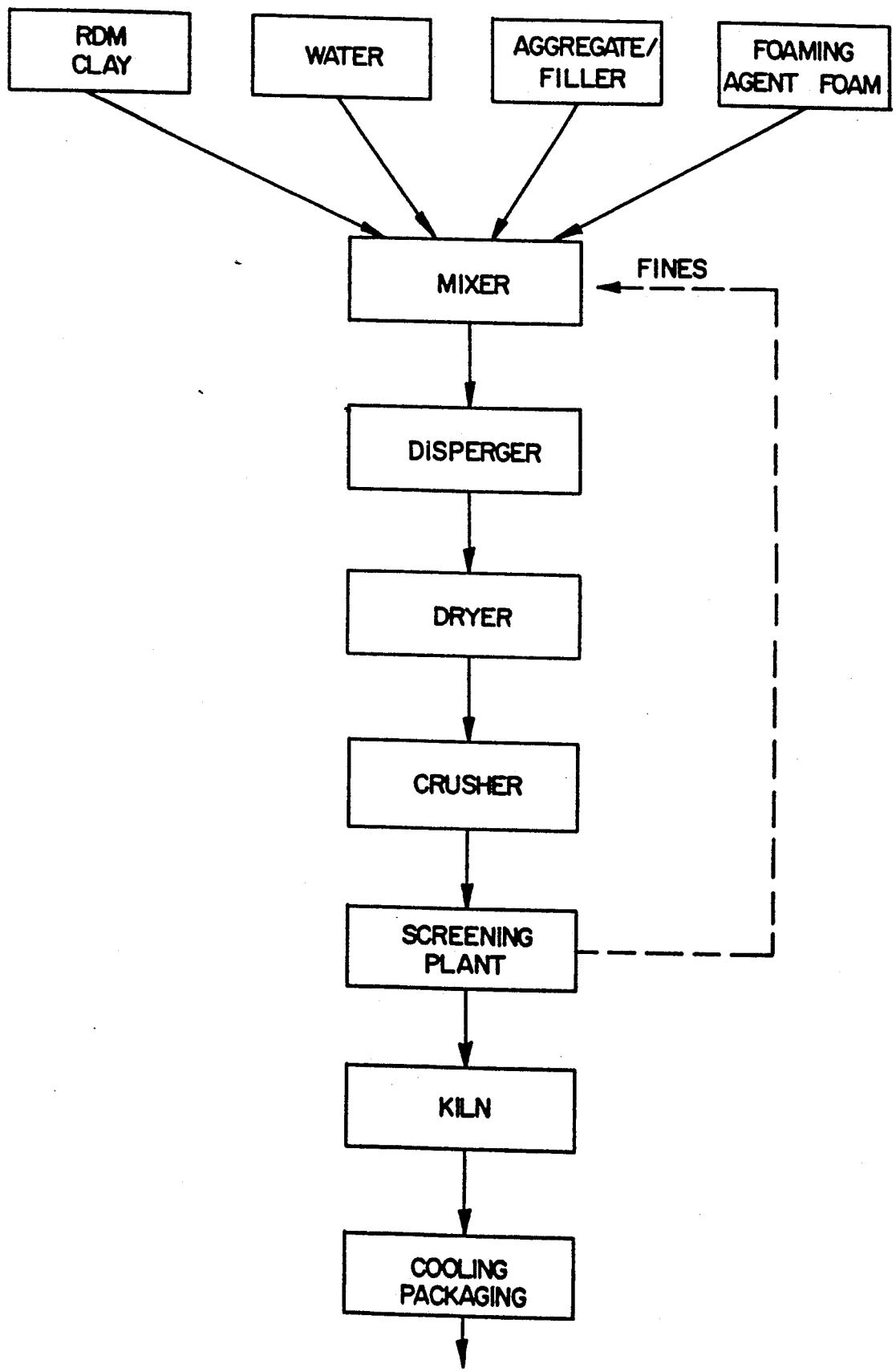

HIGHLY POROUS CERAMIC MATERIAL FOR ABSORPTION AND ADSORPTION PURPOSES, PARTICULARLY FOR ANIMAL LITTER/BEDDING

This application is a continuation of application Ser. No. 297,986, filed Jan. 17, 1989, now abandoned, which is a divisional application of Ser. No. 71,539, filed Jul. 8, 1987, now U.S. Pat. No. 4,824,810, which is a continuation of application Ser. No. 810,014, filed Dec. 17, 1985 now abandoned.

The present invention relates to highly porous ceramic material for adsorption and absorption purposes, particularly for animal litter or bedding, a process for the production thereof and the use thereof.

There is a continual need for highly porous, non-rotting materials for adsorption or absorption of liquids and gases and more particularly for use as animal litter.

Calcium silicate granules have hitherto been advantageously used for this purpose as described in from European patents Nos. 00 13 935 and 0 014 343, as well as German patents Nos. 31 21 403 and 29 02 079.

The known calcium silicate granular material advantageously has a microporous structure which, as a result of its capillary action, is able to absorb oleophilic and hydrophilic liquids, and also gaseous substances.

The known calcium silicate granular material with a microporous structure from finely ground silicon dioxide-containing material, such as quartz flour, is intimately mixed with calcium oxide-containing material, such as lime and water, accompanied by the addition of an anionic surface-active agent (surfactant). It is then foamed, followed by autoclave hardening and subsequent crushing with classification, then drying and optionally cooling. The absorbent produced according to this known process has proved highly suitable.

The object of the present invention is to provide a material for adsorption and absorption purposes, particularly for use as animal litter which, whilst retaining the favorable characteristics of the known, aforementioned material, can be produced less expensively and with greater flexibility with respect to product parameters, and particularly by means of a continuous process.

According to the invention, these advantages are achieved with a highly porous ceramic material, which is characterized by a porosity of 50 to 300%, preferably 200 to 250%; a water absorption capacity of 50 to 200%, preferably 100 to 150%; a pH-value in the range 5 to 9, preferably 7 to 8; a bulk density of 400 to 700 g/l; an internal surface (BET-$N_2$) between 20 and 200 $m^2/g$, preferably between 80 and 150 $m^2/g$; which can be produced by firing a foamed mixture of clay or clays, optionally containing aggregate or aggregates, anionic or cationic surfactant or surfactants and deflocculant or deflocculants. The process according to the invention for producing such porous ceramic materials is characterized by mixing 45 to 80 parts by weight of clay, 0 to 50 parts by weight of additives with a high specific surface, 15 to 30 parts by weight of water and 0.01 to 0.03 parts by weight of deflocculant; preparing a foamed mixture accompanied by the addition of surfactants; shaping and drying the foamed mixture to give shaped clay members; crushing the dried shape clay members; screening the crushed shaped clay members and returning the fines to the starting mixture; and firing the crushed shaped clay members with a chosen particle size range at a product temperature in the shaped clay member between 600° and 1000° C., preferably 700° to 800° C.

It is particularly advantageous to use as the clay such clays as brick clay, Westerwald stoneware clay, fine stoneware clay, kaolin, montmorillonite, bentonite and marl.

It is particularly advantageous to use as the aggregates inorganic or organic materials with a high specific surface, such as e.g. calcite quartz sand, dolomite, feldspar, chamotte kieselguhr, sepiolite, bentonite and/or organic materials, such as sawdust or coal.

As a result of the process according to the invention it is possible to economically produce highly porous ceramic products with porosities greater than 100% and preferably 200 to 250%, whereby the pore size and type can be significantly controlled.

Advantageously the time from clay preparation up to the fired product in the case of porosities over 100% amounts to up to 2 hours and less, the short process time largely resulting from the brief drying and firing time.

Normally the process according to the invention takes place in such a way that clay is mixed with water and deflocculant to give a low water content, thixotropic suspension. This suspension can be produced with clearly defined finished foam quantities, preferably with a liter weight of 30 to 80 g/l. Another process for preparing a foam suspension from a clay suspension consists of adding surfactant to the clay suspension and for foaming to take place in a dispersing plant, accompanied by the addition of compressed air. It is possible to use conventional dispersing plants, such as are e.g. marketed by Hansa Mixer, Bremen under the trade name "Hansa Mixer", which supply clearly defined compressed air quantities under a pressure of under 1 to 10 bar. The dispersing plant has a fine dosing pump, by means of which liquid can be added before and optionally during the foaming process. Advantageously when performing the process according to the invention a substance counteracting the deflocculating action of the defllocculant is used, e.g. dilute hydrochloric acid, so that it is possible to produce highly viscous, thixotropic, inherently stable foam suspensions.

The inherently stable, thixotropic foam suspension is then dried, it being possible for water vapor to pass unhindered through the pores as a result of the high inherent porosity of the material. It is particularly advantageous if the starting material mixture has a relatively low water content. Generally the dried material is provided in the form of strands with a diameter of approximately 1 cm, it being possible to work with drying times of e.g. no more than 5 minutes with temperatures of 200° C. Prior to firing, the dried material is crushed into granular form.

As a result of the porosity of the material, much as during drying, very favorable working is possible during firing. At a kiln temperature of 1000° C., corresponding to a material temperature between approximately 600° and 800° C., it is possible within a firing time of less than 5 minutes, including the heating and cooling times, to produce porous granulate suitable for absorption and adsorption purposes, particularly for use as animal litter. During this temperature treatment, the clays solidify to such an extent that they are water-insoluble.

Treatment at higher temperature is not desired for the inventive use of the material as an absorbent or as animal litter, because it leads to an embrittlement of the material and to a reduction of the internal surface. Due to the hard fracture surface formed and the reduction of the internal surface, embrittlement undesirably leads to a poorer liquid absorption. The material produced according to the invention and fired at low temperatures has a marked odor binding action and a good water absorption capacity due to the large internal surface.

It is also advantageous that porous ceramic materials are chemically neutral, i.e. have a pH-value of 5 to 8. In a particularly preferred use of the absorbent or adsorbent material according to the invention as animal litter or bedding, it can be advantageous to stabilize the pH-value, e.g. by acid or acid salt treatment, so that the pH-value is reliably kept in the range of 5 to 8, because this pH-value is particularly favorable for the odor binding of basic constituents.

Finally, the invention allows for continuous operation of the process for producing the material according to the invention.

The invention also relates to the ceramic material in solid and/or granular form as a thermal and/or noise insulating material for building purposes, as well as the use of the ceramic material in solid and/or granular form as an aggregate for high temperature building materials, such as furnace building materials, refractory building materials and the like.

For example when producing refractory building materials, the quantity of the remaining aggregates, i.e. magnesite, quartz sand and the like is adjusted in accordance with the particular function.

Particularly preferred embodiments of the porous material according to the invention or the process of the invention can be gathered from the corresponding subclaims.

Further features and advantages of the invention can be gathered from the following description of specific embodiments with respect to the diagrammatic drawing, which is a flow chart of the performance of the process according to the invention.

EXAMPLE I

500 Kg of brick clay with 200 liters of water, 400 Kg of kieselguhr, 100 g of sodium polyphosphate, 100 g of sodium dodecyl sulphonate and 5 Kg of recycled foam clay fines, are added to a mixer, vigorously stirred for approximately 5 minutes and the resulting, highly thixotropic clay suspension is fed into a mold system and in 1 cm diameter strands introduced into a rotary drier. The rotary drier, which was preheated to 200° C., passes the foam clay material, after a drying time of 5 minutes, into a crushing mill, where the dried foam clay material is crushed, the crushed foam clay particles are then separated in a screening plant into a particle fraction with sizes between 2.5 and 4 mm, which are passed to the kiln, and a particle fraction with sizes below 2.5 mm, which are returned to the starting mixture. The dried clay foam particles for firing are passed into a continuously operated kiln heated to 1000° C. and fired there for 5 minutes. The fired ceramic product is cooled and delivered to a packaging installation.

EXAMPLE II 800 g of kaolin, 200 liters of water, 200 g of sepiolite and 50 g of waterglass are thoroughly mixed in a mixer. The mixture is continuously delivered to a second mixer, which has a further feed for a Hostapur foam with a liter weight of 50 g/l, so that there is always a ratio of approximately 100 g of Hostapur per 800 Kg of kaolin. The resulting foam/clay suspension mixture is then pressed through a mold, so that strands with a diameter of 1.5 cm are obtained. The strands of dried clay are allowed to dry at ambient temperature. The dried foam/clay strands are crushed in a crusher and led to a screening plant, where a fraction of the crushed material with a diameter less than 1 mm is returned to the starting mixture, whereas the remaining particles are fed into a kiln, which is worked at a temperature of 800° C. The crushed, dried foam/clay particles are fired for 10 minutes in the kiln. The resulting porous product is cooled and led into a spray drum, where it is treated with a mixture of 31% by weight of 85% phosphoric acid and 69% by weight of an aluminium sulphate solution having a pH-value of 2 to 3.5 and a density of 1.3 to 1.34. The material sprayed with the buffer solution is then dried again and supplied to a packaging installation.

For example, the materials according to the invention have a pH-value of 7 to 8, a water absorption capacity of 50 to 150% by weight, an internal surface of 20 to 200 $m^2/g$ and a pore diameter of <1 mm.

The features disclosed in the above description, the drawing and the claims can be essential to the realization of the various embodiments of the invention, either singly or in random combinations.

We claim:

1. A highly porous ceramic material for use as an adsorbent or absorbent, having a porosity of 50 to 300 volume parts of pores per 100 volume parts of solid material; a water absorption capacity of 50 to 200%; a pH-value of 5 to 9; a bulk density of 400 to 700 g/liter; and an internal surface (BET-$N_2$) between 20 and 200 $m^2/g$, prepared by the process which comprises forming a starting mixture containing 45 to 80 parts by weight of a clay selected from the group consisting of brick clay, Westerwald stoneware clay, fine stoneware clay, kaolin, montmorillonite, bentonite and marl, 0 to 50 parts by weight of an aggregate with a high specific surface selected from the group consisting of calcite, quartz sand, dolomite, feldspar, chamotte, sepiolite, sawdust and coal, 15 to 30 parts by weight of water, 0.01 to 0.03 parts by weight of deflocculant and 0.001 to 0.01 parts by weight of a surfactant; foaming the starting mixture under pressure at a pressure of 1 to 10 bar by compressed air at a temperature between ambient temperature and 95° C. to form a foam; shaping and drying the foam to give a shaped clay member; crushing the dried shaped clay member; screening the crushed shaped clay member and returning fines to the starting mixture; and firing the crushed shaped clay member with a chosen particle size range at a product temperature in the shaped clay member between 600° and 1000° C.

2. The highly porous ceramic material according to claim 1, wherein the porosity is 200 to 250 volume parts of pores per 100 volume parts of solid material; the water absorption capacity is 100 to 150%; the pH-value is 7 to 8; and the internal surface (BET-$N_2$) is between 80 and 150 $m_2/g$.

3. The highly porous ceramic material according to claim 1, wherein the crushed shaped clay member is fired at a product temperature in the shaped clay member between 700° to 800° C.

4. The highly porous ceramic material according to claim 1, wherein the clay material is dried at a temperature between ambient temperature and 200° C.

5. The highly porous ceramic material according to claim 1, wherein the crushed shaped clay member is fired in less than 5 minutes at a kiln temperature of 1000° C., corresponding to a product temperature between 600° and 800° C.

6. The highly porous ceramic material according to claim 1, wherein the process further comprises treating the fired, porous ceramic material with an acid or an acid salt so that the pH-value of the ceramic material after treatment is between 5 and 8.

7. The highly porous ceramic material according to claim 6, wherein the acid treatment takes place in a spray drum.

8. The highly porous ceramic material according to claim 1, wherein the mixture has between 60 to 75 parts by weight of clay; 15 to 20 parts by weight of water; and 10 to 20 parts by weight of the aggregate.

9. The highly porous ceramic material according to claim 1, wherein the process further comprises adding a deflocculant-counteracting agent to the starting mixture or to the foam to produce a highly viscous, thixotropic, inherently stable foam.

10. The highly porous ceramic material according to claim 9, wherein the deflocculant-counteracting agent is dilute hydrochloric acid.

11. Animal litter, which comprises the adsorbent or absorbent as claimed in claim 1.

* * * * *